United States Patent
Gutty et al.

(10) Patent No.: US 8,301,407 B2
(45) Date of Patent: Oct. 30, 2012

(54) STABILIZED SOLID-STATE GYROLASER

(75) Inventors: François Gutty, Ville (FR); Schwartz Sylvain, Saint-Remy les Chevreuse (FR); Jean-Paul Pocholle, La Norville (FR); Gilles Feugnet, Palaiseau (FR)

(73) Assignee: Thales, Neuilly sur Seine (FR)

( * ) Notice: Subject to any disclaimer, the term of this patent is extended or adjusted under 35 U.S.C. 154(b) by 163 days.

(21) Appl. No.: 12/820,940

(22) Filed: Jun. 22, 2010

(65) Prior Publication Data
US 2011/0071787 A1    Mar. 24, 2011

(30) Foreign Application Priority Data
Jun. 22, 2009    (FR) ...................................... 09 03013

(51) Int. Cl.
*G01D 1/00*    (2006.01)
*G06F 15/00*    (2006.01)
*G06M 11/04*    (2006.01)

(52) U.S. Cl. .......................... 702/127; 356/459; 356/460

(58) Field of Classification Search .............. 702/1, 127, 702/142, 145, 150, 151, 187, 189; 372/8, 372/29.011, 29.014, 29.02, 29.021, 31, 32, 372/38.01; 360/460; 356/459, 460
See application file for complete search history.

(56) References Cited

U.S. PATENT DOCUMENTS

| | | | | |
|---|---|---|---|---|
| 3,862,803 A | * | 1/1975 | Yntema et al. | 356/467 |
| 4,783,169 A | * | 11/1988 | Matthews et al. | 356/473 |
| 7,548,572 B2 | * | 6/2009 | Schwartz et al. | 372/94 |
| 2006/0256828 A1 | * | 11/2006 | Schwartz et al. | 372/94 |
| 2007/0223001 A1 | * | 9/2007 | Feugnet et al. | 356/460 |
| 2008/0037026 A1 | * | 2/2008 | Feugnet et al. | 356/459 |

FOREIGN PATENT DOCUMENTS

| FR | 2 853 061 | 10/2004 |
|---|---|---|
| FR | 2 863 702 | 6/2005 |

OTHER PUBLICATIONS

Search Report, mailed on Feb. 1, 2010, for FR 0903013, filed on Jun. 22, 2009.

* cited by examiner

*Primary Examiner* — Eliseo Ramos Feliciano
*Assistant Examiner* — Yaritza H Perez Bermudez
(74) *Attorney, Agent, or Firm* — Stroock & Stroock & Lavan LLP

(57) ABSTRACT

Solid-state gyrolaser having a device for stabilizing the intensities making it possible to maintain equilibrium of the two counter-propagating modes having at least a means for calculating a rotation measurement ($\Omega$, $I\Omega$) of the gyrolaser on the basis of the counter-propagating modes having a frequency difference ($\Delta\text{vmes}$) between them, by assuming that the frequency difference ($\Delta\text{vmes}$) between the two counter-propagating modes is induced only by the rotation of the cavity. The gyrolaser also includes a means for measuring the control command (Co), a means for storing a behavior model (Mo) of a frequency bias ($\Delta\text{vb}$) induced by the device for stabilizing the intensities, as a function of the control command, a means for calculating the frequency bias ($\Delta\text{vb}$) induced by the device for stabilizing the intensities, on the basis of the value of the control command (Co) and the model (Mo), a means for calculating the bias ($\Delta\Omega\text{b}$, $\Delta I\Omega\text{b}$) in the rotation measurement ($\Omega$, $I\Omega$), induced by the frequency bias ($\Delta\text{vb}$), and a means for compensating for the bias ($\Delta\Omega\text{b}$, $\Delta I\Omega\text{b}$) in the rotation measurement ($\Omega$, $I\Omega$).

11 Claims, 3 Drawing Sheets

STABILIZED SOLID-STATE GYROLASER

FIELD OF THE INVENTION

The field of the invention is that of the solid-state gyrolasers used for measuring rotation speeds or relative angular displacements.

BACKGROUND

Relative angular displacement, expressed in degrees, refers to the integral of the rotation speed of the said mobile as a function of time. This type of equipment is used notably for aeronautical applications.

The gyrolaser, developed three decades ago, is widely marketed and used nowadays. Its operating principle is based on the Sagnac effect, which induces a frequency difference $\Delta\nu s$ between the two so-called counter-propagating optical emission modes, propagating in the opposite direction, of a bidirectional ring laser cavity to which a rotational movement is imparted. Classically, the frequency difference $\Delta\nu s$ is given by the following equation:

$$\Delta\nu s = 4A\omega/\lambda L \qquad (A)$$

where L and A are respectively the wavelength and area of the cavity; $\lambda$ is the laser emission wavelength without the Sagnac effect; $\omega$ is the rotation speed of the assembly.

The frequency difference $\Delta\nu s$ between the two optical modes is measured by spectral analysis of the interference of the two emitted beams. It makes it possible to ascertain the value of $\omega$ with very high precision.

The condition for observation of the interference is stability and relative equality of the intensities emitted in the two directions. It is not a priori an easy thing to obtain owing to the phenomenon of competition between modes, which means that one of the two counter-propagating modes may have a tendency to monopolize the available gain, at the cost of the other mode.

This problem is typically resolved in solid-state gyrolasers by introducing into the cavity optical losses which depend on the propagation direction of the optical mode and its intensity. The principle is to modulate these losses by a feedback device, as a function of the intensity difference between the two emitted modes, in order to favour the weaker mode at the cost of the other so as to constantly maintain equilibrium between the two counter-propagating modes.

Patent Application FR0303645, filed by the Applicant, has proposed a stabilizer device for a solid-state gyrolaser, which consists of a feedback system imposing optical losses which depend on the propagation direction, while being based on the combination of three physical effects: reciprocal rotation, non-reciprocal rotation and polarization.

FIG. 1 represents the overall diagram of a conventional gyrolaser 100. It comprises a ring cavity 1 consisting of at least three mirrors 11, 12 and 13, a solid-state amplifier medium 19 and a device 30 for stabilizing the intensities, comprising a polarizing element 71, a reciprocal effect device 7 acting on the polarization state of the counter-propagating modes and a non-reciprocal effect device 8 also acting on the polarization state of the counter-propagating modes, at least one of the effects of the said devices being controllable. The assemblies 71, 7 and 8 are arranged on the paths of the counter-propagating beams. The gyrolaser, having a solid-state amplifier medium 19, is referred to as a solid-state gyrolaser.

There is a non-reciprocal optical effect in an optical component when, the light having an initial polarization state, the polarization state of the light is different from this initial state after a return journey in the said component. Thus, the same beam travelling in the opposite direction in a non-reciprocal optical rotator will experience a rotation of its polarization direction in the same sense. There is a reciprocal optical effect in an optical component when, the light having an initial polarization state, the polarization state of the light is identical to this initial state after a return journey in the said component.

At the exit of the cavity, the two optical modes 5 and 6 are superposed by a superposition means 44 in order to give a useful signal Su, constituting interference of the two counter-propagating modes whose frequency $\Delta\nu mes$ is equal to the frequency difference between the two optical modes. The gyrolaser also comprises a means for determining a rotation measurement of the gyrolaser 3. Measuring the rotation of the gyrolaser is intended to mean measuring a quantity which represents the rotation of the gyrolaser. This is, for example, a measurement of the rotation speed $\Omega$ of the gyrolaser (expressed in rad·s$^{-1}$) or a measurement of the relative angular displacement I$\Omega$ of the gyrolaser (corresponding to the integral of the rotation speed as a function of time) expressed in rad. This measurement means 3 comprises, for example, a photodiode adapted to measure the frequency difference between the two modes. The rotation speed $\Omega$ of the gyrolaser 100 is calculated from the measured frequency difference $\Delta\nu mes$ on the basis of Equation A.

As a variant, the means 3 comprises a means for measuring the speed and the rotation direction from the number of fringes (associated with the frequency difference between the two modes) passing in one direction and in the other. This means 3 has, for example, two photodiodes arranged in quadrature relative to the fringes of the interference signal.

The angular displacement is calculated by integrating the measurement of the rotation speed over time.

When calculating the rotation measurement of the gyrolaser in the prior art, it is assumed that the frequency difference between the two counter-propagating modes is due exclusively to the rotation of the gyrolaser (Sagnac effect).

A fraction of these beams 5 and 6 is sampled by means of two semi-reflective plates 43 and sent on to two photodetectors 42. The intensity of the beams 5 and 6 may also be measured directly at the exit of the cavity, by using a second output coupler (the first being used in this case only to measure the interference signal).

The signals delivered by these two photodetectors represent the luminous intensity of the two counter-propagating modes 5 and 6. The signals are sent to a feedback electronics module 4, which drives the variable effect device as a function of the intensity of the received signals (dashed arrows on the diagram). In conjunction with the polarizing device 71, this will result in variations of the polarization states of the two counter-propagating beams. These polarization state variations will thus lead to different optical losses in the counter-propagating optical modes 5 and 6. If one of the beams has a greater luminous intensity than the other, its intensity will be attenuated more so as to return the output beams to the same intensity level. The bidirectional regime is thus stabilized in intensity, and stable and balanced bidirectional emission is obtained.

A drawback of conventional gyrolasers is the existence of a bias in the rotation measurement of the gyrolaser, this bias being induced by the device for stabilizing the intensities.

SUMMARY OF THE INVENTION

In an embodiment, the invention relates to a solid-state gyrolaser having at least one optical cavity in which two so-called counter-propagating optical modes can propagate in the opposite direction to one another, a device for stabilizing the intensities making it possible to maintain equilibrium of the two counter-propagating modes having at least, inside the cavity, an optical assembly comprising a polarizing element, a non-reciprocal effect device acting on the polarization states of the counter-propagating modes, a reciprocal effect device also acting on the polarization states of the counter-propagating modes, the device for stabilizing the intensities having control means making it possible, by establishing a control command, to control at least one of the effects of the said reciprocal effect device or non-reciprocal effect device, the said gyrolaser furthermore comprising a means for calculating a rotation measurement of the said gyrolaser on the basis of the so-called counter-propagating modes having a frequency difference between them, the means for calculating a rotation measurement calculating a rotation measurement by assuming that the frequency difference between the two counter-propagating modes is induced only by the rotation of the cavity, furthermore comprising:
- a means for measuring the control command,
- a means for storing a behaviour model of a frequency bias induced by the device for stabilizing the intensities, as a function of the control command,
- a means for calculating the frequency bias induced by the device for stabilizing the intensities, on the basis of the value of the control command and the model,
- a means for calculating the bias in the rotation measurement, induced by the frequency bias,
- a means for compensating for the bias in the rotation measurement.

The gyrolaser may furthermore have one of the following characteristics, taken together or separately:
- the rotation measurement is a measurement of the relative angular displacement of the said gyrolaser,
- the rotation measurement is a measurement of the rotation speed of the said gyrolaser,
- the behaviour model of the bias as a function of the control command is a linear model,
- the behaviour model of the bias as a function of the control command is a table listing a plurality of values of the frequency bias as a function of the value of the control command,
- it furthermore comprises a means for measuring the temperature at least at one point in the cavity,
- the means for measuring the temperature is adapted to measure a temperature with an error of less than 5° C.,
- the model is furthermore a function of the temperature at one or more points in the cavity,
- the means for measuring the control command measures the control command with a relative error of less than or equal to $10^{-4}$,
- the means for measuring the control command is a means for measuring an intensity,
- the means for measuring the control command is a means for measuring a voltage.

Accordingly, the bias induced by the stabilizing device may be thus limited and the precision of a gyrolaser equipped with a system for stabilizing the intensities, imposing optical losses which depend on the propagation direction, is consequently improved.

The gyrolaser according to an embodiment of the invention takes into account the fact that setting the cavity in rotation induces a frequency difference between the two counter-propagating modes, which is equivalent to a difference in the path length between these two modes. Specifically, in a laser, the phase shift of a beam over the path which it travels in the cavity must be a multiple of $2\pi$. This constraint is expressed in the following way:

$$\nu = p^* c/L$$

where c is the speed of light, c/L is the free spectral interval FSI of the laser and p is an integer which is fixed for a given laser. L is the distance traveled by the beam in the cavity, this distance conventionally being equal to the optical length of the cavity.

The frequency as the frequency of the beam is inversely proportional to the length traveled by the beam in the cavity, the following relation being satisfied:

$$\frac{\Delta L}{L} = \frac{\Delta \nu}{\nu}$$

That is to say:

$$\Delta L = \frac{\Delta \nu L}{\nu} = \frac{\Delta \nu}{pc}$$

where $\Delta L$ is a variation in the effective path length of a beam and $\Delta \nu$ is the frequency variation induced by this effective path length variation.

Now, in a gyrolaser, the Sagnac effect induces a frequency difference $\Delta \nu$ between the two counter-propagating optical emission modes as given by Equation A. It may be deduced from this that the Sagnac effect induces an effective length difference of the distance traveled within the cavity, between the two optical emission modes propagating the opposite direction. This first effective path length difference is defined as follows on the basis of Equations A and B:

$$\Delta Ls = \frac{4A\omega}{\lambda pcL} = \frac{\Delta \nu s}{pc}$$

where $\Delta \nu s$ and $\Delta Ls$ are respectively the frequency difference and the effective path length difference that are induced by the Sagnac effect between the two counter-propagating modes.

BRIEF DESCRIPTION OF THE DRAWINGS

The invention will be understood more clearly, and other aspects will become apparent, on reading the following description given nonlimitingly and with the aid of the appended figures, in which.

DETAILED DESCRIPTION OF PREFERRED EMBODIMENTS

Figure 1:
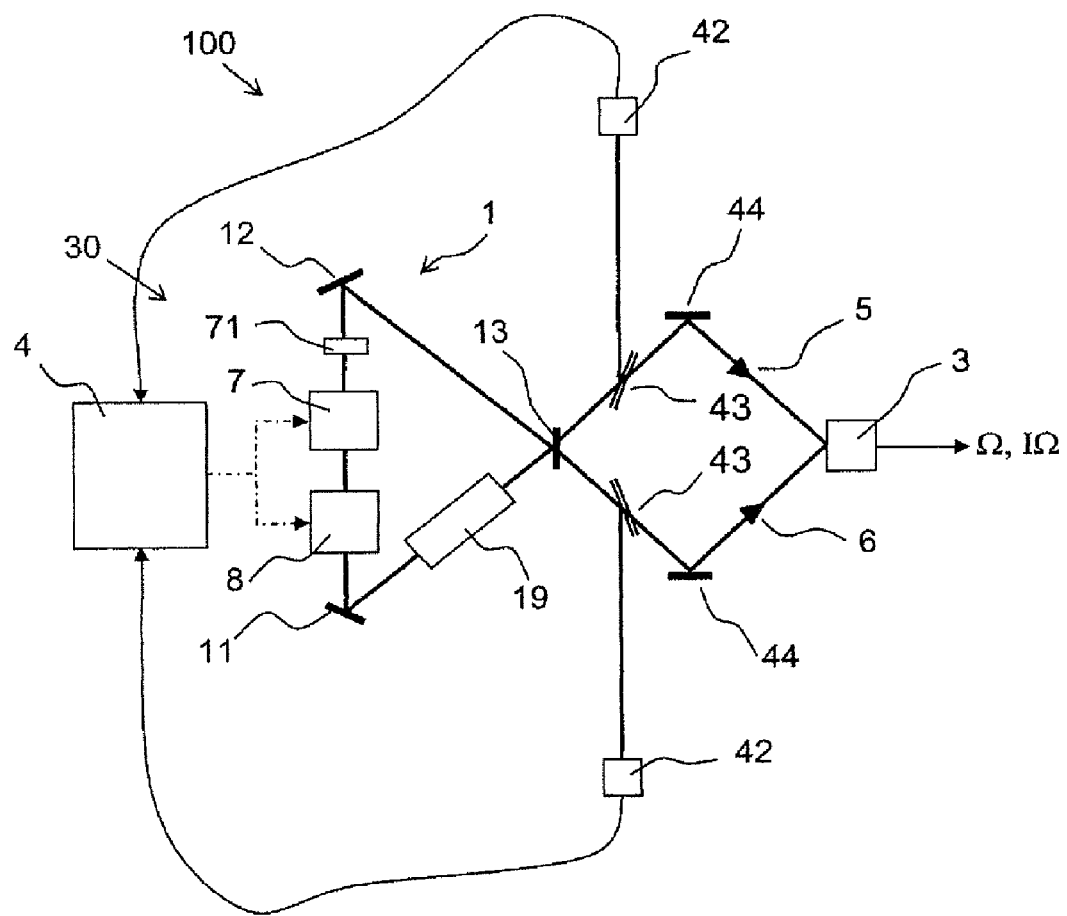
FIG. 1 represents a gyrolaser according to the prior art.
Figure 2:
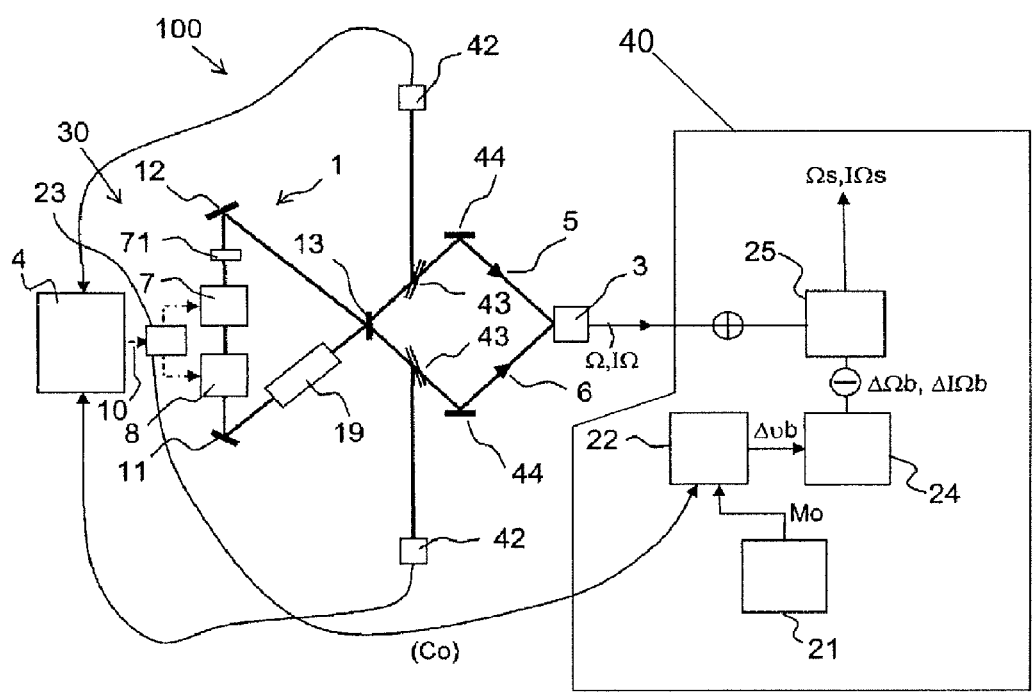
FIG. 2 represents the overall diagram of a gyrolaser according to the invention.

The gyrolaser according to an embodiment of the invention is represented in FIG. 2. The elements common to FIGS. 1 and 2 (and also 3) are denoted by the same numerical references and will not be described repeatedly. An attempt will now be made to give a vivid description to explain the origin of the bias induced by the device for stabilizing the intensities in an output measurement of the gyrolaser.

Figure 3:
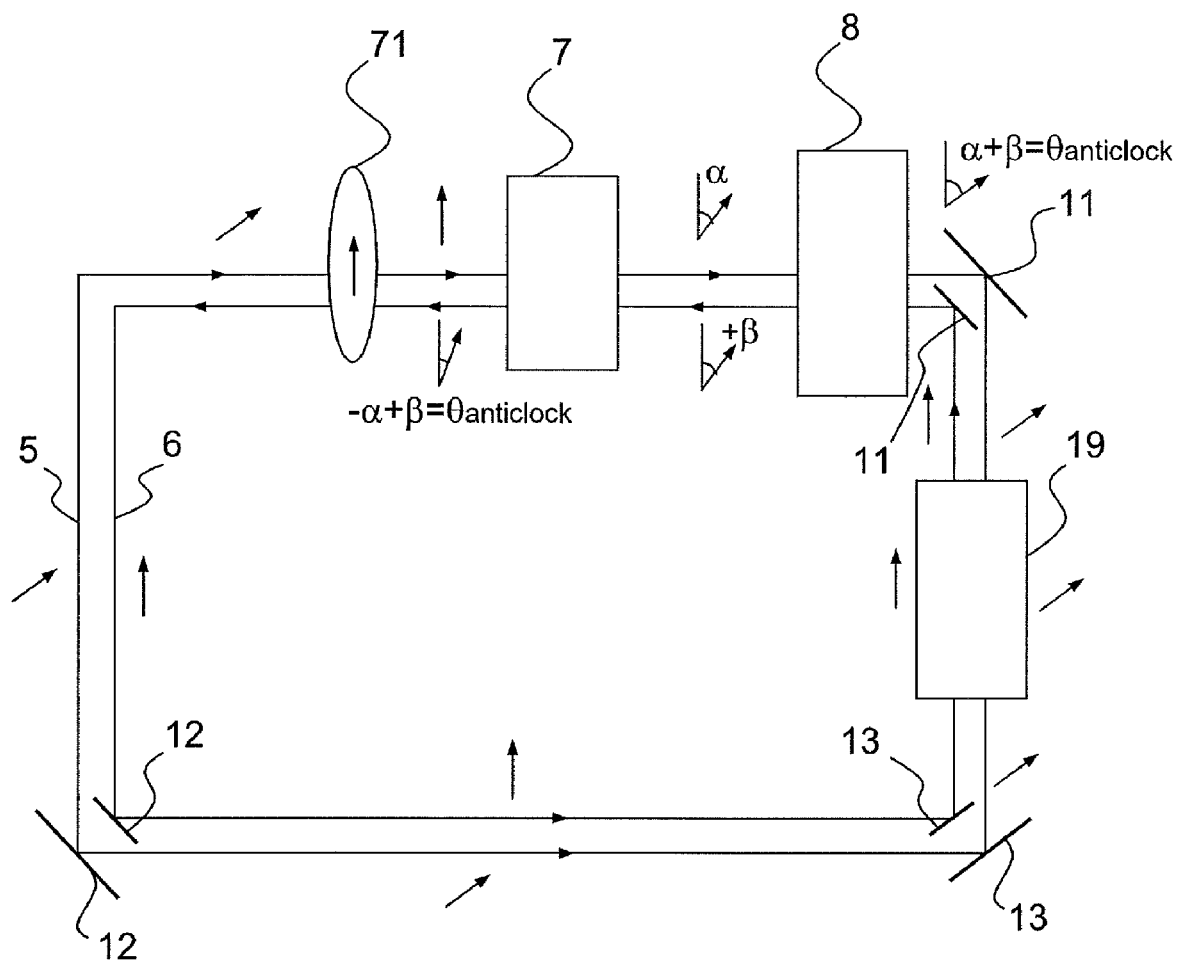
FIG. 3 represents the general principle of the device making it possible to induce losses which depend on the propagation direction according to the invention.

The combination of a reciprocal optical effect and a non-reciprocal optical effect is illustrated in the example of FIG. 3 for the case in which the reciprocal and non-reciprocal effects are simply rotations of the linear polarization. The diagram of this figure represents a ring cavity, in which two counter-propagating optical beams 5 and 6 can propagate. For better clarity, the paths traveled by the two beams 5 and 6 have been separated even though they travel along the same path in the opposite direction. The outer loop, on which the direction of the path is represented by first arrows, represents the path traveled by the first beam 5 and the inner loop, on which the direction of the path is represented by arrows pointing in the opposite direction to the first arrows, represents the path traveled by the second beam 6. The polarizations of the beams on their respective paths have also been represented by vectors. This cavity has, inter alia, an optical assembly consisting of a linear polarizer 71, of a first element 7 with a reciprocal effect acting on the polarization direction of the linearly polarized light, and a second element with a non-reciprocal effect 8 also acting on the polarization direction of the polarization of the light. The first element 7 rotates the polarization of the light by an angle α in the clockwise direction, and the second element 8 rotates the polarization by an angle β also in the clockwise direction. Considering a first optical beam 5, polarized linearly by the linear polarizer 71 and passing successively through the first and second elements, after passing through the first element its polarization direction has rotated by an angle α and after passing through the second element its polarization direction has rotated by an angle $\theta_{clock}$ equal to α+β.

Considering a second optical beam 6, polarized linearly and passing successively in the opposite direction to the first beam 5 through the second element then the first element, after passing through the second element its polarization direction has rotated by an angle β and after passing through the first element its polarization direction has rotated by an angle $\theta_{anticlock}$ equal to −α+β.

A collateral effect of the device for stabilizing the intensities is that it leads to a slight separation of the polarization states of the two counter-propagating modes over a part of the path which they travel in the cavity, the result of which is to make them sensitive to the birefringence of the cavity. The birefringence of the cavity is due, for example, to the presence of birefringent materials such as the amplifier medium 19. An amplifier medium 19 is birefringent if it contains, for example, residual mechanical or thermal stresses which make the material anisotropic.

The birefringence of the cavity may furthermore derive from the presence of imperfect mirrors 11, 12, 13, that is to say ones which induce a phase shift between two incident beams whose polarizations have different respective orientations relative to the plane s (plane perpendicular to the incidence plane). The rays then experience a different refractive index when they have a different polarization.

In a birefringent material, the refractive index is not unique but depends on the propagation and polarization directions of the light ray. It is known that when an optical beam passes through a refringent material of length d with an index n, everything happens as if the optical beam were travelling an effective length deff satisfying:

$$deff = n*d$$

If two optical beams have a different polarization direction when they pass through or are reflected by a birefringent material, they experience a different refractive index and consequently travel a different effective length.

Given that, in the cavity of the gyrolaser according to the invention, the polarization of the counter-propagating beams is different within the cavity, notably at the mirrors 11, 12, 13 and the amplifier 19, it will be understood that the birefringence in the laser cavity induces a second effective propagation length difference ΔLb between the counter-propagating optical beams (the first being due to the Sagnac effect) when the gyrolaser is equipped with a device 30 for stabilizing the intensities.

Now, according to Equation B, a second effective propagation length difference of the two optical beams induces a second frequency difference between these two beams, satisfying:

$$\Delta Lb = \frac{\Delta v b L}{v} = \frac{\Delta v b}{pc}$$

where Δvb is the second frequency difference between the counter-propagating optical beams, namely the frequency bias induced by the birefringence of the cavity.

Consequently, when the frequency difference Δvmes between the two counter-propagating beams is measured using the means 3, it will be the sum of the frequency difference induced by the birefringent materials and the frequency difference induced by the Sagnac effect.

$$\Delta vmes = \Delta vb + \Delta vs$$

If the rotation measurement of the gyrolaser is obtained by directly calculating the rotation speed Ω of the gyrolaser from the measured frequency difference and Equation A, then the calculated rotation speed will be biased because of the birefringence of the cavity.

The relative angular displacement IΩ, calculated on the basis of counting the fringes, thus also has an angular displacement bias ΔIΩb induced by the frequency bias, which is induced by the device 30 for stabilizing the intensities. Furthermore, the frequency bias Δvb varies as a function of the current delivered by the feedback device in order to stabilize the intensities of the counter-propagating modes. This bias is therefore a significant source of degradation of the performance of the solid-state laser of the prior art in the rotation measurements carried out using the gyrolaser.

In order to improve the performance of solid-state gyrolasers, the gyrolaser according to the invention comprises a device 40 for compensating for the bias induced by the intensity compensation device 30. This device is a device for compensating for the bias induced by the birefringence of the cavity owing to the presence of the device for stabilizing the intensities. Thus, this device comprises a means 25 for compensating for the bias induced by the birefringence of the cavity in the rotation measurement carried out by the means 3.

It has been observed that the frequency bias Δvb induced by the compensation device depends on the drive command Co sent by the feedback electronics module 4 to the variable effect device.

The variable effect device is either a non-reciprocal effect device 8 or a reciprocal effect device 7. In order to produce a device with a variable reciprocal effect, one possible solution consists in using a device having a birefringence which can be controlled by means of a voltage command. The command generated by the feedback electronics module is a voltage command which depends on the intensity difference between the two counter-propagating modes.

In order to produce a device with a variable non-reciprocal effect, one solution consists in using magneto-optical devices, for example with a Faraday effect, which require a magnetic field in order to operate, and in varying the magnetic field, for example by means of an induction coil surrounding the Faraday effect material. The feedback electronics module establishes a current command depending on the intensity difference between the counter-propagating beams.

When the variable effect device is a non-reciprocal effect device, the means 23 for measuring the control command is a means for measuring current. The means for measuring current preferably measures the current with an error of less than or equal to $10^{-4}$ in relative value. The error in relative value is equal to the measurement error divided by the measured value. Such a measurement is carried out with conventional means for measuring the intensity, for example with a means for measuring the voltage across the terminals of a known resistance. The signal thus measured may be analogue or digital.

When the variable effect device is a reciprocal effect device, the means 23 for measuring the control command is a means for measuring voltage. The means for measuring voltage preferably measures the voltage with an error of less than or equal to $10^{-4}$ in relative value. Conventional means for measuring voltage, of the voltmeter type, allow this type with precision to be achieved.

Specifically, a gyrolaser is referred to as a "high-performance gyrolaser" when the drift of the bias existing in the measurement of the angular displacement of the gyrolaser is less than or equal to $1/100$ degrees per hour. When compensating for the bias, a drift in excess of $1/100$ degrees per hour should not be induced. To this end, the measurement of the control command should have a relative error of less than or equal to $10^{-4}$.

The device 40 for compensating for the bias induced by the stabilizer device in a solid-state gyrolaser according to the invention will now be described in more detail.

This device comprises a means 21 for storing a behaviour model Mo of the frequency bias $\Delta vb$ induced by the device for stabilizing the intensities, as a function of the control command Co. Furthermore, the gyrolaser comprises a means 22 for calculating the frequency bias $\Delta vb$ induced by the device for stabilizing the intensities, on the basis of the control command Co and the model Mo, a means 24 for calculating the bias induced in the rotation measurement carried out by the means 3, and a means 25 for compensating for the bias induced by the birefringence of the cavity, so that the output measurement $\Omega s$ or $I\Omega s$ of the gyrolaser is a measurement of the rotation of the gyrolaser in which the bias induced by the device for compensating for the frequencies has been corrected. The means 22 for calculating the frequency bias induced by the device for stabilizing the intensities calculates a frequency bias $\Delta vb$ on the basis of the value of the control command Co, measured by the means 23 for measuring the control command Co, and a behaviour model Mo of the bias as a function of the control command Co.

The model Mo consists, for example, of a table listing the value of the bias for a plurality of values of the control command Co. As a variant, the model corresponds to a model established on the basis of tables while approximating the behaviour of the bias as a function of the control command. For example, the behaviour model of the bias may be a linear model.

A table corresponding to a behaviour model Mo of the frequency bias is established in the factory by a conventional calibration technique.

On the basis of the frequency bias, the means 24 calculates the bias $\Delta\Omega b$ or $\Delta I\Omega b$ in the rotation measurement of the gyrolaser.

In the example in which the means 3 for calculating a rotation measurement calculates an angular velocity measurement $\Omega$, the means 24 converts this frequency bias $\Delta vb$ into an angular velocity bias $\Delta\Omega b$ on the basis of Equation A.

In the example of a rotation measurement as relative angular displacement $I\Omega$, the measurement of the angular velocity bias $\Delta\Omega b$ is furthermore integrated as a function of time in order to give an angular displacement bias $\Delta I\Omega b$.

By way of nonlimiting examples, with a typical value of 0.1 mrad for the separation of the polarizations and a typical phase shift of the order of 1 degree between the planes s and p of a mirror, the rotation speed bias is of the order of 100 deg/h.

The means 25 for compensating for the bias induced by the device for stabilizing the intensities subtracts the bias in the rotation measurement as rotation speed $\Delta\Omega b$ or as relative angular displacement $\Delta I\Omega b$, respectively, from the rotation speed measurement $\Omega$ or the relative angular displacement $I\Omega$, respectively, so as to obtain an output rotation measurement S which is a compensated rotation speed $\Omega s$ or a compensated relative angular displacement $I\Omega s$, respectively.

The assembly formed by the means 3, 21, 22, 23, 24 and 25 is a means for calculating an output rotation measurement of the gyrolaser on the basis of the counter-propagating modes. This output rotation measurement is a compensated rotation measurement, that is to say one in which at least some of the bias induced by the device for stabilizing the intensities is corrected.

In a preferred embodiment of the invention, the correction model for the bias induced by the device for stabilizing the intensities is refined with the aid of one or more temperature sensors arranged in the laser cavity. A variation in the temperature of the cavity may, for example, induce an expansion or a contraction of the Faraday material being used, thus changing the value of the non-reciprocal rotation and therefore the bias.

To this end, the gyrolaser according to an embodiment of the invention comprises a means for measuring the temperature at one or more points in the cavity, comprising one or more means for measuring the temperature at respective points in the cavity. The behaviour model of the frequency bias as a function of the control command is furthermore a function of the temperature of the cavity.

Preferably, the means for measuring the temperature measures the temperature with an error of less than 5° C. Conventional temperature sensors are capable of providing such a precision. Such sensors are commonly used in inertial navigation devices (notably gas gyrolasers). In this way, a so-called "high-performance" solid-state gyrolaser can be provided.

The inertial performance of a solid-state gyrolaser equipped with a device for stabilizing the intensities, using a device with a reciprocal rotation effect, a device with a non-reciprocal rotation effect and a polarizer, is thus improved.

The calculation means described in the patent application are, for example, digital calculation means of the software type or of the hardware type.

While there have been shown and described particular features of the invention as applied to preferred embodiments thereof, it will be understood that various omissions, substitutions, and changes in the form and details of the devices illustrated, and in their operation, may be made by those skilled in the art without departing from the spirit and scope of the invention.

The invention claimed is:

1. A solid-state gyrolaser comprising:
at least one optical cavity in which two counter-propagating optical modes can propagate in opposite direction to one another, and
a device for stabilizing intensities so as to maintain equilibrium of the two counter-propagating modes having at least, inside the optical cavity, an optical assembly comprising:
   a polarizing element,
   a non-reciprocal effect device acting on polarization states of the counter-propagating modes,
   a reciprocal effect device also acting on the polarization states of the counter-propagating modes,
the device for stabilizing the intensities having:
   control means operable to establish a control command to control at least one effect of the said reciprocal effect device or non-reciprocal effect device,
   a means for calculating a rotation measurement of the gyrolaser on a basis of the counter-propagating modes having a frequency difference between them, the means for calculating a rotation measurement being operable to calculate a rotation measurement by assuming that the frequency difference between the two counter-propagating modes is induced only by rotation of the optical cavity, characterized in that it furthermore comprises:
a means for measuring the control command,
a means for storing a behaviour model of a frequency bias induced by the device for stabilizing the intensities, as a function of the control command,
a means for calculating the frequency bias induced by the device for stabilizing the intensities, on the basis of a value of the control command and the model,
a means for calculating a bias in the rotation measurement induced by the frequency bias, and
a means for compensating for the bias in the rotation measurement.

2. The solid-state gyrolaser according to claim 1, wherein the rotation measurement includes a measurement of a relative angular displacement of the said gyrolaser.

3. The solid-state gyrolaser according to claim 1, wherein the rotation measurement includes a measurement of a rotation speed of the said gyrolaser.

4. The solid-state gyrolaser according to claim 1, wherein the behaviour model of the bias as a function of the control command includes a linear model.

5. The solid-state gyrolaser according to claim 1, wherein the behaviour model of the bias as a function of the control command includes a table listing a plurality of values of the frequency bias as a function of the value of the control command.

6. The solid-state gyrolaser according to claim 1, further comprising a means for measuring a temperature of at least at one point in the optical cavity.

7. The solid-state gyrolaser according to claim 6, wherein the means for measuring the temperature is adapted to measure a temperature with an error of less than 5° C.

8. The solid-state gyrolaser according to claim 6, wherein the model is furthermore a function of the temperature at one or more points in the optical cavity.

9. The solid-state gyrolaser according to claim 1, wherein the means for measuring the control command measures the control command with a relative error of less than or equal to $10^{-4}$.

10. The solid-state gyrolaser according to claim 1, wherein the means for measuring the control command includes a means for measuring an intensity.

11. The solid-state gyrolaser according to claim 1, wherein the means for measuring the control command includes a means for measuring a voltage.

* * * * *